(12) United States Patent
Halford et al.

(10) Patent No.: US 6,614,836 B1
(45) Date of Patent: Sep. 2, 2003

(54) BIASED-CORRECTED RAKE RECEIVER FOR DIRECT SEQUENCE SPREAD SPECTRUM WAVEFORM

(75) Inventors: Steven D. Halford, Palm Bay, FL (US); Mark A. Webster, Palm Bay, FL (US); George R. Nelson, Merritt Island, FL (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 09/494,000

(22) Filed: Jan. 28, 2000

(51) Int. Cl.$^7$ ............................................. H04B 1/707
(52) U.S. Cl. ..................................................... 375/152
(58) Field of Search ................................. 375/130, 143, 375/142, 150, 152; 370/208, 320, 335, 342, 441

(56) References Cited

U.S. PATENT DOCUMENTS 6,011,812 A * 1/2000 Laakso et al. ............... 375/152
6,349,110 B1 * 2/2002 Davidovici et al. .......... 375/152

OTHER PUBLICATIONS

Kenneth Abend, "Statistical Detention for Communication Channels with Intersymbol Interference", *Proceedings of the IEEE*, Vol 58, No 5, May 1970, pp. 779–785.

* cited by examiner

Primary Examiner—Emmanuel P. Bayard
(74) Attorney, Agent, or Firm—Gary R. Stanford

(57) ABSTRACT

The performance of a RAKE receiver for indoor multipath WLAN applications on direct sequence spread spectrum signals having relatively short codeword lengths comprises a channel-matched filter and codeword correlator front end, plus a signal combiner to which the codeword correlation component is applied. The signal combiner is supplied with a bias-corrected input calculated by a distorted codeword signature (power) generator, which is operative to generate and store a set of N codeword power correction values. The signal combiner combines correction values into the codeword correlation for each potentially transmitted codeword $S_k$. This serves to correct each correlation codeword metric by a de-biasing power component $|S_k|^2$ for the unequal multipath-based distortions of the codeword energies. The output of the signal combiner is coupled to a peak detector, which selects a minimum distance-based 'de-biased' output as the transmitted codeword.

8 Claims, 3 Drawing Sheets

BIASED-CORRECTED RAKE RECEIVER FOR DIRECT SEQUENCE SPREAD SPECTRUM WAVEFORM

CROSS-REFERENCE TO RELATED APPLICATIONS

The present application relates to subject matter disclosed in co-pending U.S. patent application Ser. No. 09/342,583, filed Jun. 29, 1999, M. Webster et al, entitled "RAKE Receiver with Embedded Decision Feedback Equalizer," referred to hereinafter as the '583 application, assigned to the assignee of the present application and the disclosure of which is incorporated herein.

FIELD OF THE INVENTION

The present invention relates in general to wireless communication systems, such as but not limited to wireless local area networks (WLANs), and is particularly directed to a new and improved channel-matched correlation receiver, or RAKE receiver, that employs a direct sequence spread spectrum codeword correlation metric, in which unequal energies in respectively different codewords are corrected, so as to increase the receiver's tolerance to the effects of multipath distortion, without losing robustness to thermal noise.

BACKGROUND OF THE INVENTION

The ongoing demand for faster (higher data rate) wireless communication products is currently the subject of a number of proposals before the IEEE 802.11 committee, that involve the use of a new standard for the 2.4 GHz portion of the spectrum, which FCC Part 15.247 requires be implemented using spread spectrum techniques that enable data rates to exceed 10 megabits per second (Mbps) Ethernet speeds. The 802.11 standard presently covers only one and two Mbps data rates using either frequency hopping (FH) or direct sequence (DS) spread spectrum (SS) techniques. The FCC requirement for the use of spread spectrum signaling takes advantage of inherent SS properties that make the signals less likely to cause inadvertent interference by lowering the average transmit power spectral density, and more robust to interference through receiver techniques which exploit spectral redundancy.

One type of self-interference which can be reduced by SS receiver techniques is multipath distortion. As shown in FIG. 1, the power delay profile (PDF) 10 of a transmitted signal due to multipath within an indoor WLAN system, such as the reduced complexity example illustrated in FIG. 2, typically exhibits an exponentially-decayed Rayleigh fading characteristic. Physical aspects of the indoor transmission environment driving this behavior are the relatively large number of reflectors (e.g., walls) within the building, such as shown at nodes 12 and 13, between a transmitter site 14 and a receiver site 15, and the propagation loss associated with the longer propagation paths $t_1$, $t_2$ and $t_3$, which contain logarithmically weaker energies.

The power delay profile of the signal is the mean signal power with respect to time of arrival. When each time of arrival obeys a Rayleigh distribution, the mean power level of the signal establishes the variance of its corresponding Rayleigh components. A logical explanation of the exponentially decayed multipath effect is due to the fact that a signal's propagation delay $t_i$ is proportional to the total distance traveled. On-average, therefore, the strongest (those encountering the minimum number of obstructions), are the minimal obstruction transmission paths whose signals arrive earliest at the receiver.

In terms of a practical application, the root mean squared (RMS) of the delay spread for a multipath channel may range from 20–50 nsec for small office and home office (SOHO) environments, 50–100 nsec for commercial environments, and 100–200 nsec for factory environments. For exponentially faded channels, the (exponential) decay constant is equal to the RMS delay spread.

The presence of multipath generates interference for communications systems. This interference is the result of multiple copies of the same signal arriving at the receiver with different temporal relationships, different amplitudes, and different carrier phases. When the majority of the multipath delays are less than the inverse signal bandwidth, the majority of the interference is due to different amplitude and carrier phases rather than different signal temporal properties. This type of multipath interference is referred to as "flat" fading because all frequencies in the signal undergo the same multipath effects. Because the path delays are less than the symbol duration, the interference is confined to one symbol or is primarily intra-symbol. Frequency-selective fading in contrast occurs when paths with significant energy have relative delays greater than the inverse signal bandwidth. In this case, the interference is primarily due to different temporal relationships between the information symbols or what is commonly called intersymbol interference. The frequencies present in the signal undergo different multipath effects due the intersymbol interference and this type of interference is also called frequency-selective fading.

Interference from flat fading is seen at the receiver as a reduction in the signal-to-noise ratio and is generally impossible to combat unless diversity reception is available. There are, however, several receiver techniques available for reducing the impact of frequency selective fading. Because there are more options available for frequency-selective fading environments, many systems are designed so that the basic symbol duration is much shorter than necessary to support the information rate. In the frequency domain, the short symbol duration results in a larger bandwidth than required to support the information rate. In other words, the information bandwidth has been spread and hence this is referred to as spread spectrum. In actuality, this results in frequency diversity and consequently can be thought of as providing diversity for what was a flat fading environment.

Increasing the bandwidth of the signal or spreading the signal can be accomplished in a number of ways and the design of spreading codes for communications systems has been the topic of research and development for many years. Direct sequence (DS) techniques are one common set of methods. A direct sequence system uses many sub-symbols or "chips" to represent a single information symbol. To decode the transmitted data, the optimal DS receiver finds the candidate information symbol that is "closest" to the received data in a Euclidean distance sense. In other words, the receiver finds the symbol with the symbol with the minimum distance to the received sequence. In the absence of multipath, the minimum distance receiver is implemented with a correlation receiver since correlation is equivalent to distance when all sequences have the same energy. In the presence of multipath, the correlation receiver must take into account the distortion due to the channel. To account for the multipath channel, the correlation receiver is modified to include matching to the channel as well as to the possible symbol sequences. For DS systems, the spreading sequence can be selected to have nearly impulsive auto-correlation and low cross-correlation properties. When such sequences are used in a channel matched correlation receiver, the individual paths comprising the multipath are coherently combined and the detrimental effects of multipath are reduced because the receiver is taking advantage of the frequency diversity. The use of a channel matched correlation receiver is typically called a Rake receiver.

As diagrammatically illustrated in FIG. 3, in a channel-matched correlation or RAKE receiver, the received (spread) signal is coupled to a codeword correlator 31, the output of which (shown as a sequence of time-of-arrival impulses 32-1, 32-2, 32-3) is applied to a coherent multipath combiner 33. The codeword correlator 31 contains a plurality of correlators each of which is configured to detect a respectively different one of the codewords of the multi-codeword set. As a non-limiting example, the coherent multipath combiner may be readily implemented as a channel matched filter (whose filter taps have been established by means of a training preamble prior to commencement of a data transmission session). The output of the coherent multipath combiner 33 may be coupled to a peak or largest value detector 35, which selects the largest magnitude output produced by the coherent multipath combiner as the transmitted codeword. Since the RAKE receiver is a linear system, the order of the operations carried out by the channel matched filter (coherent multipath combiner) 33 and codeword correlator 31 may be reversed, as shown in FIG. 4, wherein the channel matched filter 33 is installed upstream of the codeword correlator 31.

When the multipath delays are a significant fraction of the information symbol duration (as opposed to the chip duration), the energy of the received symbols is not constant across all symbols but instead depends on the symbol spreading sequence and the multipath channel. Consequently, the Rake receiver can-not be considered the optimal minimum distance receiver. The present invention enhances the Rake receiver by adjusting the channel matched correlation receiver for the different symbol energies observed in a multipath channel. By incorporating the energy into the receiver decision statistic the modified Rake receiver described is closer to the optimal minimum distance receiver and consequently has improved performance.

The modified Rake primarily addresses the problem of interference within an information symbol. Because information symbols are sent back to back, further improvement is possible by removing or reducing the interference from adjacent symbols. A method for obtaining this improvement is described in the above-referenced '583 patent application.

SUMMARY OF THE INVENTION

In accordance with the present invention, an alternative channel matched/RAKE receiver modification is employed. Rather than incorporate the functionality of a decision feedback equalizer, the minimum distance calculation for each codeword (symbol) generated by the signal processing path through the channel-matched filter and codeword correlator is adjusted or corrected by a bias-correction or 'de-bias' value that corresponds to the expected power for that symbol as a result of being transmitted over the multipath channel. This de-bias correction is based upon the fact that, as multipath delay increases and becomes a noticeable fraction of the codeword duration, the value of the codeword power component, per se, for each of the codeword correlation metrics is no longer the same. This codeword energy variation is significant, since optimal performance of a RAKE receiver requires that each codeword of the multichip codeword set have the same energy as each other codeword of the set. The present invention solves this problem by modifying (de-biasing) the minimum distance calculation for each codeword generated by the signal processing path through the channel-matched filter and codeword correlator of the RAKE receiver.

A RAKE receiver architecture of the invention may comprise a conventional channel-matched filter and codeword correlator front end, plus a signal combiner to which the codeword correlation component is applied. The signal combiner is also supplied with a de-bias input calculated by a distorted codeword signature (power) generator, which is operative to generate and store a set of N codeword power correction values, that are respectively injected into the codeword correlation for each potentially transmitted codeword $S_k$. This serves to correct each correlation codeword metric by a de-biasing power component $|S_k|^2$ for the unequal multipath-based distortions of the codeword energies. The output of the signal combiner is coupled to a detector, which selects the largest 'de-biased' correlation output.

The codeword power correction values may be generated by convolving each of the N DSSS multichip codewords of the data set with a finite impulse response estimate of the multipath channel. The taps or impulse coefficients of the channel can be generated during a preamble training interval conducted prior to commencement of data transmission. This convolution of each of the potentially transmitted N codewords with the estimated channel produces an associated set of N multipath-distorted codeword 'signatures'. The energy in each of these codeword 'signatures' is computed to generate a set of N distortion codeword signature power values $|S_k|^2$ for the distorted codeword signature (power) generator. By combining these computed distorted signature power values with the codeword correlation components generated by the receiver front end, the signal combiner effectively compensates for the unequal power components $|S_k|^2$, thereby improving the accuracy of the codeword decision generated by the peak detector.

As a further aspect of the invention this multipath channel-distorted codeword signature power de-biasing mechanism may be incorporated into the DFE-embedded signal processing architecture of the type described in the above-referenced '583 application.

DETAILED DESCRIPTION

Figure 1:
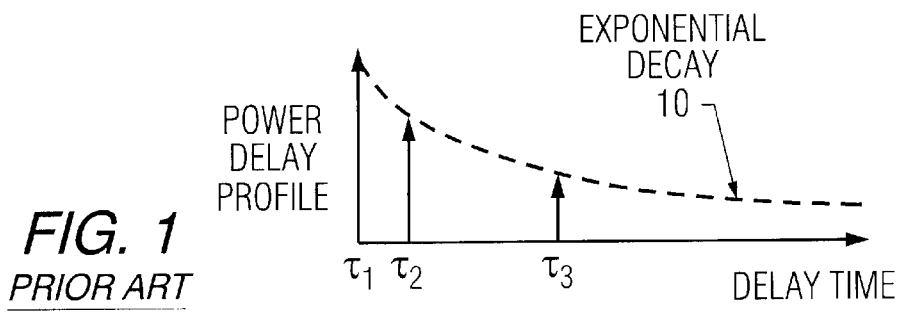
FIG. 1 shows the power delay profile associated with multipath distortion of an indoor WLAN system.

Before describing in detail the new and improved bias-corrected RAKE receiver architecture of the present invention, it should be observed that the invention resides primarily in prescribed modular arrangements of conventional digital communication circuits and associated digital signal processing components and attendant supervisory control circuitry therefor, that controls the operations of such circuits and components. In a practical implementation that facilitates their incorporation into existing printed circuit cards of wireless telecommunication equipment, these modular arrangements may be readily implemented as field programmable gate array (FPGA)-implementation, application-specific integrated circuit (ASIC) chip sets, programmable digital signal processors, or general purpose processors.

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Figure 5:
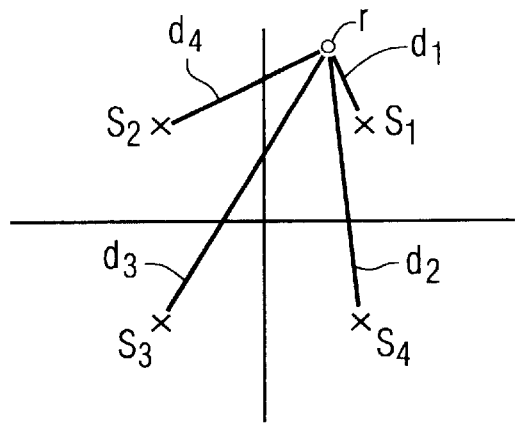
FIGS. 5 shows a QPSK constellation of four possibly transmitted signals $S_1$, $S_2$, $S_3$ and $S_4$, and an actually received signal 'r'.

In order to appreciate the improvement provided by the bias-corrected RAKE receiver of the invention, it is initially useful to examine the distortion effects of a multipath channel on the signal received and processed by the RAKE receiver. As a non-limiting example, FIG. 5 shows a QPSK constellation of four possibly transmitted signals $S_1$, $S_2$, $S_3$ and $S_4$, and an actually received signal 'r'. In this complex QPSK signal space, in the absence of multipath distortion, the received signal r is separated from the possibly transmitted signals by respective vector distances $d_1$, $d_2$, $d_3$ and $d_4$, due to the presence of (Gaussian) noise in the transmission channel. To determine which of the four possible signals $S_1$, $S_2$, $S_3$ and $S_4$ was actually transmitted, the receiver's processor computes the distances $d_1$, $d_2$, $d_3$ and $d_4$, and selects the transmitted signal as that whose distance is smallest or minimum.

The calculation of a respective minimum distance $|d_k|$ may be illustrated as follows.

$$|d_k|^2 = |r - S_k|^2 \text{ (where } k=0,1,2,3 \text{ for QPSK)}$$

In complex conjugate notation:

$$|d_k|^2 = (r - S_k)(r - S_k)^*;$$
$$= (r - S_k)(r^* - S_k^*);$$
$$= |r|^2 - rS_k^* - r^*S_k + |S_k|^2;$$
$$= |r|^2 - 2\text{Real}[rS_k^*] + |S_k|^2.$$

Figure 6:
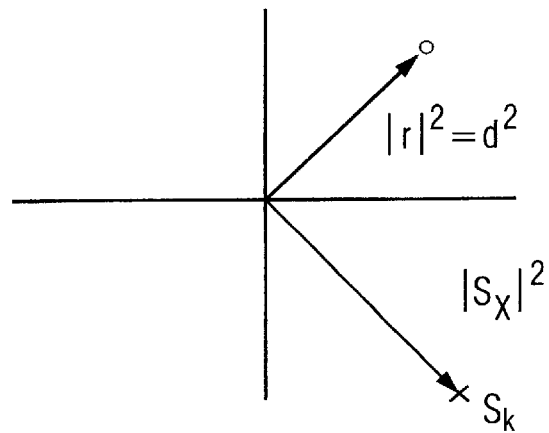
FIG. 6 is a vector diagram of received signal power $|r|^2$ and actually transmitted symbol/codeword power $|S_k|^2$.

In the above equation, the component $[rS_k^*]$ of the complex term represents the correlation of the receive signal with a respective possibly transmitted signal. The remaining 'power' terms are the received signal power $|r|^2$ and the actually transmitted symbol/codeword power $|S_k|^2$, graphically illustrated in the vector diagram of FIG. 6. In order to generate a 'choose the largest' correlation metric, a negative version of the distance equation may be expressed as:

$$|d_k|^2 = |r|^2 + 2\text{Real}[rS_k^*] - |S_k|^2.$$

Since the received signal power component $-|r|^2$ is the same for all received codewords, it may be and is customarily discarded, reducing the minimum distance calculation to $2\text{Real}[rS_k^*] - |S_k|^2$. In addition, it is customary practice in a Rake receiver to ignore the power or energy component $|S_k|^2$, so that a determination of what codeword was actually transmitted may be based upon only the value correlation component $2\text{Real}[rS_k^*]$.

Figure 2:
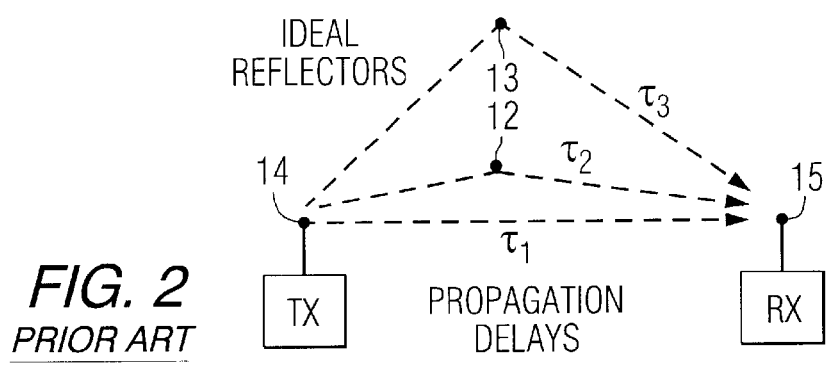
FIG. 2 diagrammatically illustrates a reduced complexity example of an indoor WLAN system having a plurality of reflectors between a transmitter site and a receiver site.
Figure 3:
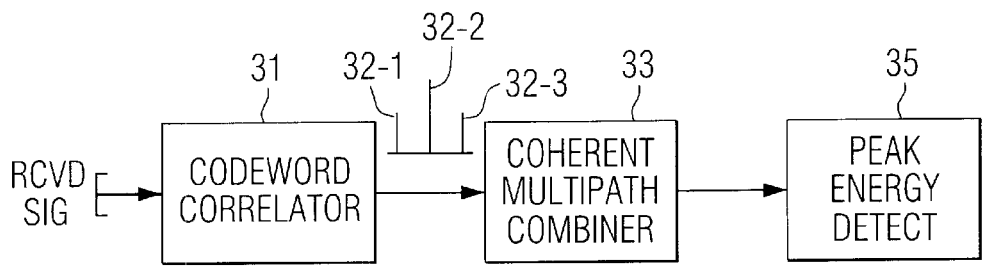
FIG. 3 diagrammatically illustrates a conventional RAKE receiver.
Figure 4:
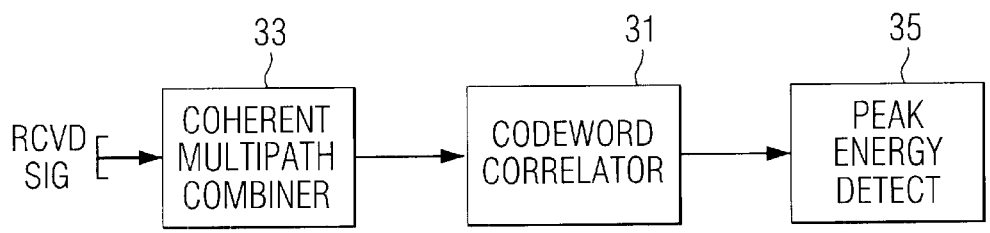
FIG. 4 shows the RAKE receiver of FIG. 3, in which the order of the operations carried out by the channel matched filter (coherent multipath combiner) and codeword correlator are reversed.
Figure 7:
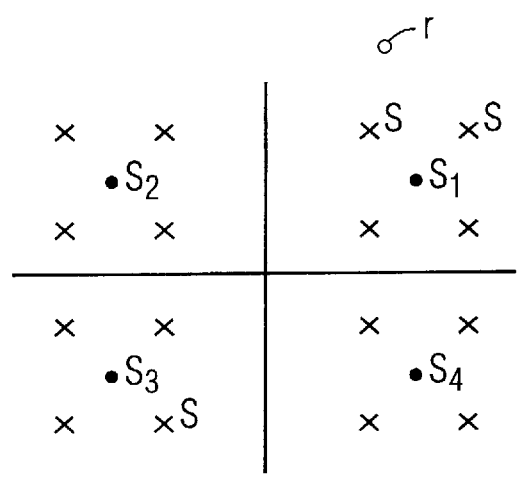
FIG. 7 shows a multipath-smeared version of the QPSK constellation of FIG. 5.

In a multipath environment, however, where an earliest to arrive (direct path) signal may be accompanied by one or more echoes, as described above with reference to FIGS. 1 and 2, the signal space can become 'smeared', as diagrammatically illustrated in FIG. 7 for the QPSK space example of FIG. 5. As multipath delay increases and becomes a noticeable fraction of the codeword duration, the value of the power component $|S_k|^2$ for each of the codeword correlation metrics is no longer the same. This codeword energy variation is significant, since, as noted above, optimal performance of a RAKE receiver requires that each codeword of the set of N multichip codewords have the same energy as each other codeword of the set.

As pointed out above, the present invention solves this problem by modifying (de-biasing or bias-correcting) the minimum distance calculation for each symbol (codeword) generated by the signal processing path through the channel-matched filter and codeword correlator of the RAKE receiver.

In particular, the invention is operative to adjust the minimum distance calculation input to the largest magnitude detection operation by a 'de-bias' value that is equal to the expected power for that symbol as a result of being transmitted over the multipath channel.

Figure 8:
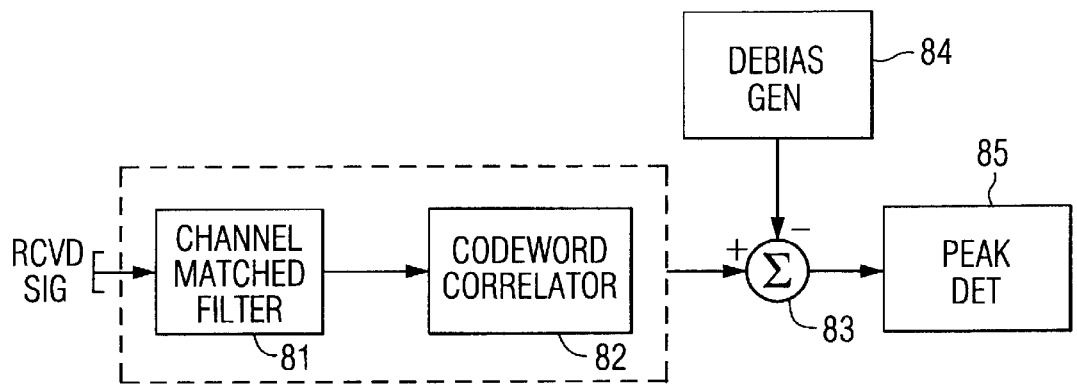
FIG. 8 diagrammatically illustrates a modified RAKE receiver architecture of the present invention.

This modified RAKE receiver architecture is diagrammatically illustrated in FIG. 8 as comprising a conventional RAKE receiver front end 80, containing a channel-matched filter 81 and a codeword correlator 82, plus a signal combiner (summing unit) 83 to which the codeword correlation component $2\text{Real}[rS_k^*]$ generated by the receiver front end is applied. Signal combiner 83 also supplied with a de-bias input calculated by a distorted codeword signature (power) generator 84. As will be described in detail below with reference to FIG. 9, generator 84 is operative to generate and store a set of N codeword power values $|S_k|_2$ (where k =1, 2, 3, . . . , N), that are respectively injected into the above-referenced codeword correlation for each potentially transmitted codeword $S_k$, thereby correcting each correlation codeword metric by a de-biasing power component $|S_k|^2$ that corrects for the unequal multipath-based distortions of the codeword energies. The output of the signal combiner 83 is coupled to a peak detector 85, which selects the largest 'de-biased' output as the transmitted codeword.

Figure 9:
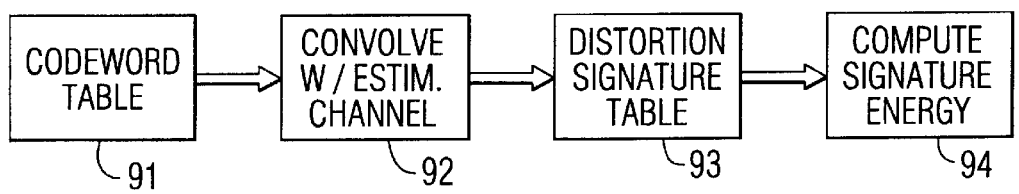
FIG. 9 is a functional flow diagram of the generation of codeword power correction values.

As shown in the functional flow diagram of FIG. 9, each of the respective codeword entries of a codeword table 91, in which the N (e.g., 64) DSSS multichip codewords of an available data set are stored, is accessed and convolved at 92 with a finite impulse response filter-based estimate of the multipath channel, taps or weighting coefficients of which have been generated during a preamble training interval conducted prior to commencement of data transmission.

This convolution of each of the potentially transmitted N codewords with the estimated channel produces an associated set of N multipath-distorted codeword 'signatures' that are stored in a distortion signature table 93. It should be noted that although each of the N DSSS codewords may be M-ary (e.g., QPSK) encoded with additional phase information, only the real component is necessary to determine power. Therefore, for the current example of 256 possibly transmitted codeword phase combinations, only the sixty-four basic codeword chips are considered.

The energy in each of these codeword 'signatures' is then computed at 94 to produce a set of N distortion codeword signature power values $|S_k|^2$ for the distorted codeword signature (power) generator 84. By combining these computed distorted signature power values with the codeword correlation components 2Real [$rS_k^*$] generated by the receiver front end, the signal combiner 83 effectively compensates for the unequal power components $|S_k|^2$, thereby improving the accuracy of the codeword decision generated by the peak detector 85.

Figure 10:
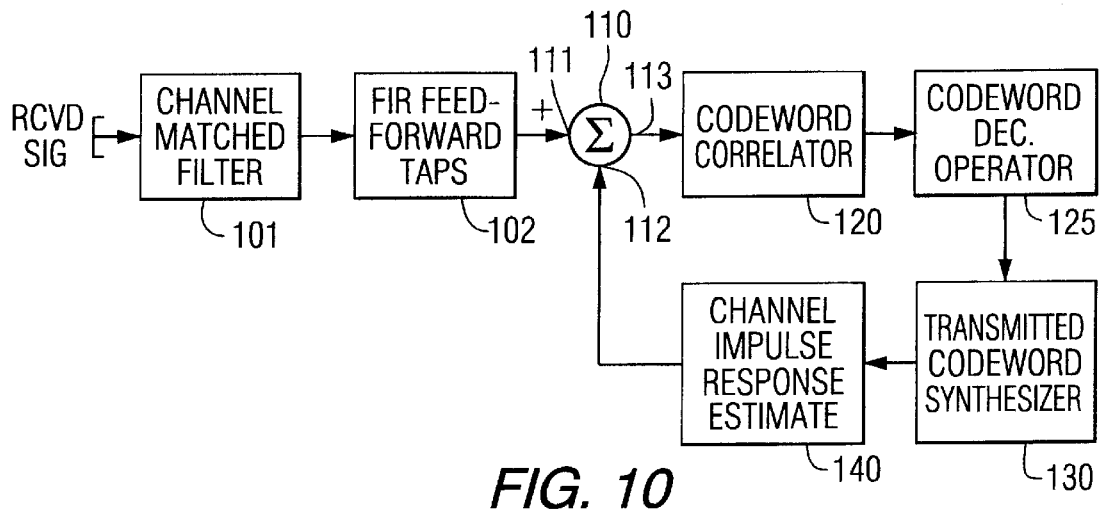
FIG. 10 diagrammatically illustrates a DFE-embedded signal processing architecture of the type described in the above-referenced '583 application, that incorporates the multipath channel-distorted codeword signature power de-biasing mechanism of the present invention.

FIG. 10 diagrammatically illustrates a DFE-embedded signal processing architecture of the type described in the above-referenced '583 application, that incorporates the multipath channel-distorted codeword signature power de-biasing mechanism of the present invention. As shown therein, the output of the RAKE receiver's channel matched filter 101 is coupled through a set of DFE feed-forward taps 102 to a first input 111 of differential combiner 110. For efficient signal processing the channel matched filter 101 and the feed-forward tap section 102 of the DFE may be implemented as a 'whitened' matched filter.

The differential combiner 110 has a second input 112 coupled to receive a post-cursor representative echo that is produced by estimating the channel impulse response. The output 113 of the differential combiner 110, which represents a 'cleaned-up' copy of the received codeword, is coupled to a codeword correlator 120, which executes the de-biasing mechanism of the invention, described above. The de-biased output of the codeword correlator 120 is coupled to a codeword decision operator 125, which chooses the largest correlator output as the actually transmitted codeword.

Given this codeword decision derived by operator 125, a replica of the chip contents and phase information of the decided upon transmitted codeword is then synthesized in a transmitted codeword synthesizer 130. This synthesized codeword is then convolved with an estimate of the channel impulse response implemented in an FIR filter 140, so as to produce a representation of the post-cursor multipath echo in the signal received by the channel matched filter 101. By applying this post-cursor echo to the differential combiner 110, the total ISI contribution in the output of the channel matched filter 101 is effectively canceled from the input to the codeword correlator 120. As noted in the '583 application, the estimate of the channel impulse response synthesized in the FIR filter 140 is not codeword length restricted; it covers the entirety of the post-cursor multipath echo in the signal received by the channel matched filter 101, whether it crosses one or a plurality of codeword boundaries.

As will be appreciated from the foregoing description, in the channel matched/RAKE receiver of the invention, the minimum distance calculation for each codeword generated by the signal processing path through the channel-matched filter and codeword correlator is corrected by a bias-correction value that corresponds to the expected power for that symbol as a result of being transmitted over the multipath channel, so as to correct for unequal energies in respectively different codewords and thereby increase the receiver's tolerance to the effects of multipath distortion, without losing robustness to thermal noise.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method for detecting received multichip direct sequence spread spectrum codewords that have been transmitted over a multipath channel comprising the steps of:

(a) coupling said received multichip direct sequence spread spectrum codewords to a channel matched filter;

(b) performing codeword correlations on an output of said channel matched filter with respectively different codewords of pluralities of direct sequence spreading chips, and correcting for contribution of unequal energies of said respectively different codewords in codeword correlation metrics produced thereby; and (c) selecting a respectively transmitted codeword in accordance with a minimum distance-based correlation metric output of step (b).

2. A method according to claim 1, wherein step (b) comprises performing a minimum distance calculation for each received codeword, and defining the minimum distance calculation to step (c) in accordance with a bias-correction value equal to an expected power for that codeword as a result of being transmitted over said multipath channel.

3. A method according to claim 1, wherein step (b) includes combining respective ones of a set of N codeword power values $|S_k|^2$ (where k =1, 2, 3, ..., N) into said codeword correlation for each potentially transmitted codeword $S_k$, and correcting said each correlation codeword metric by a bias-correction power component $|S_k|^2$ for unequal multipath-based distortions of codeword energies.

4. A method according to claim 3, wherein step (b) comprises convolving N DSSS multichip codewords with a finite impulse response filter estimate of said multipath channel to produce N multipath-distorted codeword signatures, and computing energy in each of said multipath-distorted codeword signatures to generate said set of N distortion codeword signature power values $|S_k|^2$.

5. A channel-matched correlation signal processor for a direct sequence spread spectrum receiver employable in a multipath environment comprising:

a channel matched filter to which received codewords of pluralities of direct sequence spreading chips are applied;

a codeword correlator unit, coupled in a signal processing path with said channel matched filter, and being operative to perform codeword correlations on said received codewords with respectively different codewords of pluralities of direct sequence spreading chips, and being configured to correct for the contribution of unequal energies of said respectively different codewords in codeword correlation metrics produced thereby; and a detector which is operative to select a respectively transmitted codeword in accordance with a minimum distance correlation metric output from said codeword correlator unit.

6. A channel-matched correlation signal processor according to claim 5, wherein said codeword correlator unit is operative to perform a minimum distance calculation for each received codeword, and to define the minimum distance calculation to said detector by a bias-correction value that is equal to an expected power for that codeword as a result of being transmitted over said multipath environment.

7. A channel-matched correlation signal processor according to claim 5, wherein said codeword correlator unit is operative to employ a set of N codeword power values $|S_k|^2$ (where k=1, 2, 3, . . . , N), that are respectively combined with said codeword correlations for each potentially transmitted codeword $S_k$, thereby correcting each correlation codeword metric by a bias-correction power component $|S_k|^2$ that corrects for unequal multipath-based distortions of codeword energies.

8. A channel-matched correlation signal processor for a direct sequence spread spectrum receiver employable for a multipath channel comprising:

a channel matched filter coupled to feed-forward taps of a decision feedback equalizer;

a differential combiner coupled to differentially combine an output of said feed-forward taps and a post-cursor representative echo produced by a finite impulse response filter estimates impulse response of said multipath channel;

a codeword correlator which is operative to perform codeword correlations on received multichip direct sequence spread spectrum codewords for respectively different codewords of pluralities of direct sequence spreading chips, and being configured to correct for contribution of unequal energies of said respectively different codewords in codeword correlation metrics produced thereby;

a codeword decision operator which is operative to detect a selected output of said codeword correlator as the actually transmitted codeword;

a codeword synthesizer which is operative to generate a replica of chip contents and phase information of said actually transmitted codeword; and a finite impulse response filter configured to synthesize an estimate of said multipath channel impulse to which said codeword synthesizer is coupled to produce said post-cursor representative echo.

* * * * *